Dec. 8, 1936.  K. E. PEILER ET AL  2,063,849
MECHANISM FOR AND METHOD OF SPRAYING GLASS CUTTING SHEARS OR THE LIKE
Filed Sept. 24, 1935
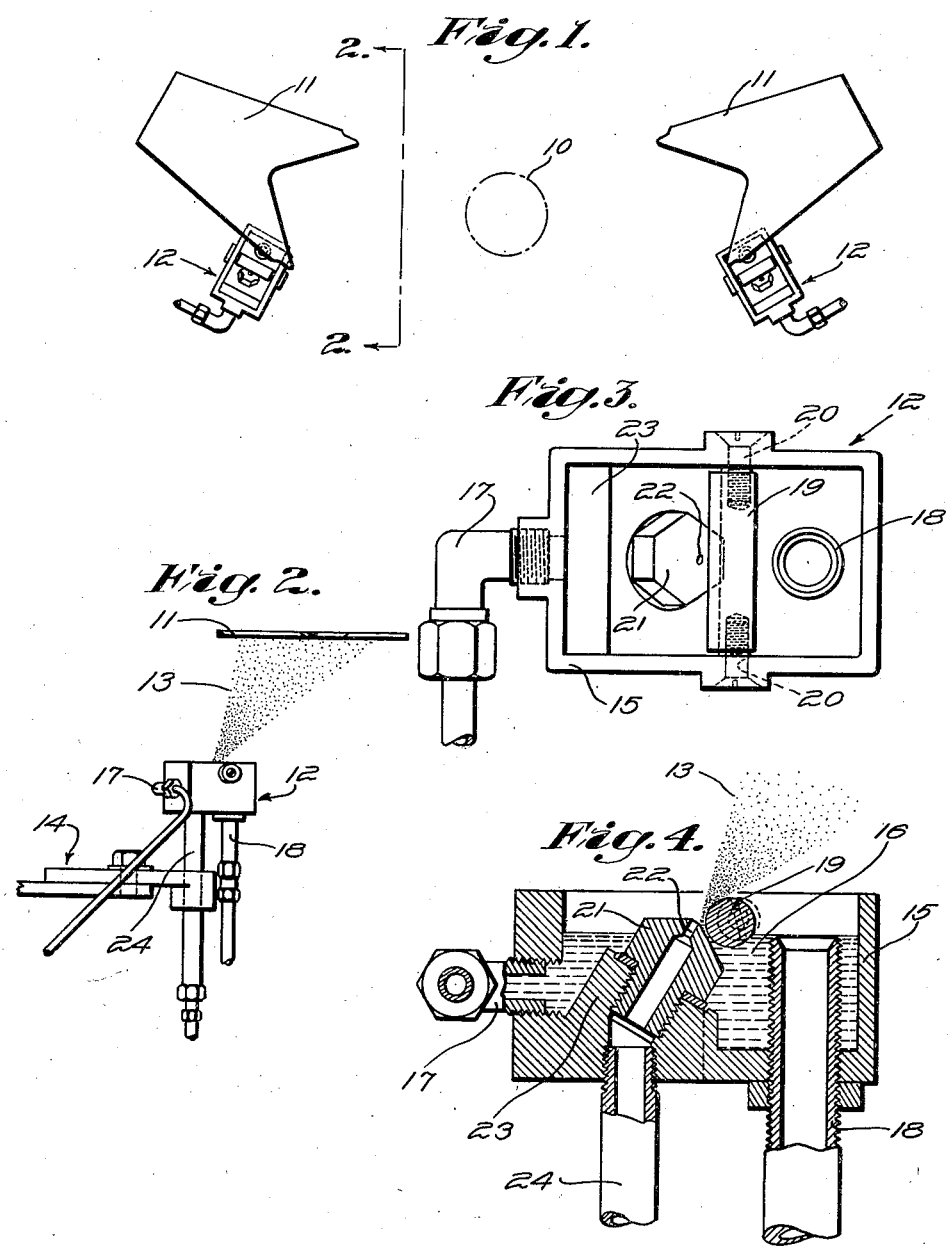
Inventors;
Karl E. Peiler
Donald K. Morgan
by Burns & Parlow
Attorneys
Witness:
W. B. Thayer.

Patented Dec. 8, 1936

2,063,849

UNITED STATES PATENT OFFICE 2,063,849

MECHANISM FOR AND METHOD OF SPRAYING GLASS-CUTTING SHEARS OR THE LIKE

Karl E. Peiler and Donald K. Morgan, West Hartford, Conn., assignors to Hartford-Empire Company, Hartford, Conn., a corporation of Delaware Application September 24, 1935, Serial No. 41,882

8 Claims. (Cl. 49—14)

This invention relates generally to spray mechanisms and more particularly to a mechanism for spraying the shear blades of a glass feeder.

An object of the invention is to provide a mechanism for spraying glass cutting shears, or the like, with more uniformly distributed smaller and more uniform liquid particles than those which are produced by prior shear spraying devices.

A further object of the invention is to provide a spray mechanism of the character described which will function uniformly and efficiently in service with but very little, if any, attention, repair or adjustment.

A still further object of the invention is to produce a spray by the action of air under pressure blowing across and against liquid on a practically unconfined surface.

Another object of the invention is to utilize the forces of surface tension and suction to provide a continuously renewed uniform sheet or skin of liquid on a supporting surface and to produce the spray desired by the action of an air blast effective to blow liquid of this sheet or skim from such surface.

Other objects and advantages of the invention will hereinafter be pointed out or will become apparent from the following description of a particular embodiment of the invention, as shown in the accompanying drawing, in which:

Figure 1 is a plan view, showing a pair of sprayers embodying the invention in position to spray the blades of glass cutting shears when such blades are open and have been retracted laterally of the axial line of a glass feed outlet;

Fig. 2 is a view in elevation, taken from the line indicated at 2—2 of Fig. 1, and looking in the direction of the arrows, showing one of the shear blades and the manner in which it is cooled and lubricated with spray from the associate sprayer;

Fig. 3 is a relatively enlarged plan view of one of the sprayers shown in Fig. 1; and Fig. 4 is a longitudinal vertical section through the sprayer shown in Fig. 3, with portions shown in elevation.

Mechanisms for spraying the blades of glass cutting shears, such as the shears of glass feeders, have been proposed and some are in extensive use.

In general, such spray mechanisms as are used to spray glass cutting shear blades operate on a principle which involves discharge from a restricted space, such as a nozzle or other discharge orifice, of a mixture of liquid and air under pressure. Such mechanisms and the mode of operation which characterizes them permit undesirable irregularity of the size and distribution of the liquid particles of the spray produced. Thus, spray produced by such a prior shear spray mechanism may include irregularly occurring relatively large drops of liquid or aerated drops of liquid. The effectiveness of such a spray to cool and lubricate shear blades of a glass feeder or the like is thereby lessened.

According to the present invention, the spray is produced by the action of air under pressure blowing liquid of a thin sheet or mass from a practically unconfined surface. This spray is practically free from the defects above mentioned.

Referring now to the drawing, Fig. 1 shows diagrammatically a glass feeder outlet 10. A pair of shear blades 11 are shown in their retracted positions laterally of the axial line of the feeder outlet. When closed, these shear blades may function to sever mold charges from glass that has issued from the feeder outlet.

Associated with each shear blade is a sprayer 12 which embodies structural features of the invention. Each sprayer 12 comprises a complete, operative unit.

As shown in Fig. 2, the left hand shear blade of the mechanism of Fig. 1 is being thoroughly sprayed at and adjacent to its cutting edge with a spray, indicated at 13, consisting of regularly distributed uniform fine particles of liquid, produced by the associate sprayer 12. Such sprayer is supported, as by the supporting structure indicated at 14, Fig. 2, in the position required to effect spraying of the shear blade without projecting spray directly below the feeder outlet.

A generally similar situation exists with respect to the right hand shear blade and its associate sprayer 12.

Reference now may be had to Figs. 3 and 4, for a better understanding of the structural features of the sprayer 12.

Such sprayer comprises a container 15 which is open at its top and holds a supply body of liquid 16. A liquid supply pipe is designated 17. For adjusting the level of the liquid supply body in the container 15 and for maintaining such level substantially constant, the container 15 may be provided with an adjustable overflow pipe, indicated at 18.

A partly submerged substantially cylindrical rod 19 extends transversely of the container 15 and is eccentrically supported between the side walls of such container, as by the aligned opposite screws 20, Fig. 3. The reason for supporting the member 19 eccentrically will hereinafter be pointed out.

A pressure air nozzle 21 is located within the container 15 so that its discharge orifice 22 is turned toward the cylindrical member 19. As shown, the nozzle 21 has a stem portion in screw threaded engagement with an inclined embossed portion 23 of the bottom wall of the container 15 and the bore of this nozzle communicates through the bore of this embossed portion of the container bottom with a pressure air supply pipe 24. This, however, is but one of various ways in which the pressure air nozzle may be mounted within the container 15 so that it will be in position to direct an air jet or stream of air under pressure against or across the adjacent surfaces of the member 19. As shown, the axial line of the nozzle orifice lies in a plane approximately tangent to the cylindrical member 19.

Surface tension will cause liquid of the supply body to travel or creep upwardly on the practically unconfined peripheral surface of the member 19 adjacent to the nozzle 21 to a level above that of the supply body of liquid. The air jet or stream of air under pressure from the nozzle 21, blowing across the periphery of the member 19, will create a suction which will be effective on the portion of the liquid supply body subtended by the angle between the member 19 and the air jet or stream from the nozzle 21. This suction will supplement the action of surface tension so that a thin sheet or mass of liquid from the supply body will be provided on the surface of the member 19 next to the nozzle 21 and liquid from such sheet or mass will be blown from the supporting surface in a fine spray by the air jet or stream of air under pressure from the nozzle.

The angle of incidence of the air jet or stream of air under pressure to the liquid induction surface of the supporting member 19 may be varied from that shown. It may be such that the member 19 will function as a deflector in addition to supporting the liquid in position to be broken up into spray.

The effective distance between the supporting induction surface of the member 19 and the nozzle 21, the extent of submergence or dip of this member 19 in the liquid supply body 16, and the above mentioned angle of incidence may be conveniently adjusted by loosening the screws 20, turning the member 19 angularly about the axial line of the supporting screws to the position desired, and then tightening such screws to maintain such adjusted position. Adjustment of the member 19 in this manner may be employed to vary within limits the size of the particles of liquid of the spray produced and also the quantity of liquid in such spray.

Any other suitable known means for adjusting the member 19 about its eccentric axis or toward and away from the air nozzle 21 or to vary the extent of submergence of this member in the liquid supply body, or to vary the angle of incidence between the air jet and the portion of the member 19 against which it impinges, may be used in lieu of the particular adjustable eccentric structure shown and above described.

Preferably, the liquid intake of the supply container will be adjusted in any suitable known manner so that there will be a constant slight overflow of liquid from the container through the overflow pipe 18, the level of the supply body in the container remaining practically unchanged. This level may be predetermined by adjustment of the level to which the upper end of the overflow pipe will extend in the container 15.

The spray may be intermittent or continuous, dependent upon whether air under pressure is discharged continuously from the nozzle 21 or at intervals. Of course, if the spray is produced intermittently the periods of production thereof will be suitably timed with relation to the retractive movements of the shear blade that is to be sprayed so as to effect spraying of the latter when it is in its retracted position. Any suitable timing mechanism, many examples of which are well known, may be associated with the pressure air supply line to effect desirably timed intermittent applications of the air jet or stream of air to the liquid on the member 19 if an intermittent operation is desired. The suction on the portion of the supply body of liquid subtended by the angle between the air jet and the member 19 will of course be intermittent when the air jet or stream of air under pressure is applied intermittently.

The continuous circulation of liquid through the container, as when there is a continuous slight over-flow from the container through the pipe 18, will tend to keep the structure of the device cool and will aid in reducing or obviating precipitation. Also, it is to be noted that the liquid being sprayed is not forced through a restricted passage, such as the bore of the nozzle, and consequently there is no restricted liquid conducting passage or nozzle to be clogged in service by matter that has been carried in suspension by the supply body of liquid. This makes for continued efficiency of the device during long and continued service and when used to spray the shear blades with liquid of any suitable consistency and character.

The mechanism shown and above described may be altered and modified in many respects without departing from the spirit and scope of the invention. For example, the cylindrical member 19 may be replaced by a plate or other supporting member having a function in the hereinbefore described combination generally corresponding with that of the member 19 but having a form and a liquid induction surface of a contour different from that shown. The invention therefore is not to be limited to the structural details shown on the accompanying drawing or beyond the meaning of the terms of the appended claims.

I claim:

1. A sprayer for a shear blade of a glass feeder comprising an open-topped container for a liquid supply body located below and adjacent to the shear blade when the latter is retracted, a nozzle for directing a stream of pressure fluid upwardly from a point adjacent to the surface of the liquid in the container toward said retracted shear blade, and a member having a liquid induction surface partly submerged by said supply body of liquid and extending above the latter to the path of said stream of pressure fluid and at an acute angle therewith for cooperating with the latter to induce movement of liquid from the supply body to position on said surface to be sprayed therefrom onto said retracted shear blade.

2. A sprayer comprising a container for a supply body of liquid, a member within said container having a surface partly submerged in said supply body and extending above the latter, and a pressure fluid supply conduit having a nozzle for directing a stream of pressure fluid against said surface at an acute angle with the latter to create a suction on the portion of the supply body subtended by said angle for drawing liquid of the supply body upwardly on said surface into the path of said pressure fluid and to blow liquid from said surface in the form of spray.

3. A sprayer comprising a container for a supply body of liquid, means for maintaining said supply body at a substantially constant level, a member having a surface partly submerged by said supply body and partly above the level of the supply body, a pressure fluid nozzle located within said supply body adjacent to said surface and in position to project a stream of pressure fluid across an unsubmerged portion of said surface at an acute angle therewith and at a place sufficiently close to the position of the supply body subtended by said angle to induce upward movement of liquid of the supply body into the path of said pressure fluid stream.

4. A sprayer comprising a container for a supply body of liquid, a liquid supply conduit operatively connected with said container, a vertically adjustable overflow conduit adapted to cooperate with said liquid supply conduit to maintain the supply body in the container at a substantially constant level, a member within the container having a liquid induction surface partly submerged by the supply body and extending above the level of the latter, and a conduit for discharging a stream of pressure fluid into contact with an unsubmerged portion of said liquid induction surface at an acute angle therewith for blowing liquid from said surface in the form of spray.

5. A blower comprising a container for a supply body of liquid, a pressure fluid nozzle located in position to direct a stream of pressure fluid upwardly from a point close to the surface of said supply body and in a plane extending at an acute angle therewith, and a member having a surface partly submerged in said supply body and extending above said supply body to the path of said stream of pressure fluid at an acute angle with the latter for cooperating with the latter to induce upward movement of liquid from the supply body to position to be blown from said surface by said pressure fluid stream.

6. A blower comprising a container for a supply body of liquid, a pressure fluid nozzle located in position to direct a stream of pressure fluid upwardly from a point close to the surface of said supply body and in a plane extending at an acute angle therewith, and a substantially cylindrical member having its axis substantially horizontal and substantially at right angles with said stream of pressure fluid, said member being located within said container so that a portion of its periphery is submerged by liquid of the supply body and another portion of said periphery is swept by said stream of pressure fluid at a place above the level of said supply body but sufficiently close thereto and to said nozzle to cooperate with said stream of pressure fluid to cause an induced movement of liquid from the supply body upwardly into the path of said pressure fluid.

7. A blower comprising a container for a supply body of liquid, a pressure fluid nozzle located in position to direct a stream of pressure fluid upwardly from a point close to the surface of said supply body and in a plane extending at an acute angle therewith, a substantially cylindrical member having its axis substantially horizontal and substantially at right angles with said stream of pressure fluid, said member being located within said container so that a portion of its periphery is submerged by liquid of the supply body and another portion of said periphery is swept by said stream of pressure fluid at a place above the level of said supply body but sufficiently close thereto and to said nozzle to cooperate with said stream of pressure fluid to cause an induced movement of liquid from the supply body upwardly into the path of said pressure fluid, and means for mounting said cylindrical member in said container for angular adjustment about an axis eccentric to said member.

8. The method of producing a spray for cooling and lubricating a shear blade or the like, comprising the steps of providing a supply body of liquid adjacent to the object to be sprayed, causing a localized suction on only a portion of the surface of the supply body to cause liquid of the supply body to move upwardly from said surface level while substantially unconfined and blowing air against said upwardly moving substantially unconfined liquid and toward said object to produce a spray and to direct said spray onto said object.

KARL E. PEILER.
DONALD K. MORGAN.